United States Patent
Jang et al.

(10) Patent No.: US 9,974,092 B2
(45) Date of Patent: May 15, 2018

(54) IN-DEVICE INTERFERENCE AVOIDANCE METHOD AND APPARATUS FOR TERMINAL EQUIPPED WITH MULTIPLE COMMUNICATION MODULES

(75) Inventors: Jae Hyuk Jang, Suwon-si (KR); Soeng Hun Kim, Yongin-si (KR); Gert-Jan Van Lieshout, Apeldoorn (NL); Kyeong In Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 616 days.

(21) Appl. No.: 13/270,507

(22) Filed: Oct. 11, 2011

(65) Prior Publication Data

US 2012/0087341 A1    Apr. 12, 2012

Related U.S. Application Data

(60) Provisional application No. 61/391,743, filed on Oct. 11, 2010.

(30) Foreign Application Priority Data

Sep. 27, 2011 (KR) .................. 10-2011-0097469

(51) Int. Cl.
*H04W 72/12* (2009.01)
*H04W 36/30* (2009.01)
(Continued)

(52) U.S. Cl.
CPC ........ *H04W 72/1215* (2013.01); *H04W 36/30* (2013.01); *H04W 48/08* (2013.01); *H04W 76/048* (2013.01); *H04W 88/06* (2013.01)

(58) Field of Classification Search
None
See application file for complete search history.

(56) References Cited

U.S. PATENT DOCUMENTS 6,445,917 B1 * 9/2002 Bark ............... H04W 24/00
                                                    370/331
6,600,726 B1 * 7/2003 Nevo et al. ............ 370/278
(Continued)

FOREIGN PATENT DOCUMENTS

JP   2008-521309 A    6/2008
WO   2009/137295 A2   11/2009

OTHER PUBLICATIONS

3GPP TS 36300-850. 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8) The present 2008.*

(Continued)

*Primary Examiner* — Jeffrey M Rutkowski
*Assistant Examiner* — Andre Tacdiran
(74) *Attorney, Agent, or Firm* — Jefferson IP Law, LLP

(57) ABSTRACT

A method and apparatus for avoiding in-device interference in a terminal equipped with multiple heterogeneous communication modules (e.g. Long Term Evolution (LTE), Wireless Local Area Network (WLAN), Bluetooth, and Global Positioning System (GPS) modules) are provided. The method includes one of detecting and predicting interference caused by the second communication module to communication of the first communication module, transmitting an interference occurrence information message to a base station for controlling to avoid the interference, and controlling to avoid the interference by executing one of a handover and discontinuous reception according to a control command included in an interference occurrence information response message transmitted by the base station. The terminal provides the cell with the interference-related information, the cell configures the Discontinuous Reception (DRX) based on the interference-related information, and (Continued)

the terminal can reduce in-device interference through the controlled DRX operation, resulting in improvement of communication reliability of the communication modules.

11 Claims, 6 Drawing Sheets

(51) Int. Cl.
*H04W 48/08* (2009.01)
*H04W 76/04* (2009.01)
*H04W 88/06* (2009.01)

(56) References Cited

U.S. PATENT DOCUMENTS

| | | | |
|---|---|---|---|
| 2002/0102941 A1* | 8/2002 | Kuiri et al. ..................... | 455/63 |
| 2007/0159998 A1* | 7/2007 | Ruuska et al. ................. | 370/328 |
| 2009/0186614 A1* | 7/2009 | Aoyama ............ | H04W 76/048 |
| | | | 455/436 |
| 2009/0232118 A1* | 9/2009 | Wang .................... | H04L 5/0091 |
| | | | 370/338 |
| 2009/0239566 A1* | 9/2009 | Pelletier ............. | H04W 56/005 |
| | | | 455/517 |
| 2009/0279511 A1 | 11/2009 | Zhu | |
| 2010/0029215 A1 | 2/2010 | Honkanen et al. | |
| 2010/0195501 A1 | 8/2010 | Tynderfeldt et al. | |
| 2010/0304770 A1* | 12/2010 | Wietfeldt et al. ............ | 455/509 |
| 2011/0243047 A1* | 10/2011 | Dayal et al. .................. | 370/311 |
| 2011/0243094 A1* | 10/2011 | Dayal et al. .................. | 370/331 |
| 2011/0256870 A1* | 10/2011 | Park ..................... | H04W 36/30 |
| | | | 455/436 |
| 2011/0319065 A1* | 12/2011 | Dalsgaard ............. | H04L 1/0027 |
| | | | 455/418 |
| 2012/0014371 A1* | 1/2012 | Weng .................... | H04J 3/0682 |
| | | | 370/350 |
| 2012/0040620 A1* | 2/2012 | Fu ........................ | H04B 1/1027 |
| | | | 455/63.1 |

OTHER PUBLICATIONS

Zte, "Modelling of interference avoidance for in-device coexistence", 3GPP TSG RAN WG2 #71, R2-104640, Aug. 23-27, 2010.
Media Tek, "Analysis in In-Device Coexistence Interference Avoidance", 3GPP TSG RAN WG2 #71, R2-104444, Aug. 23-27, 2010.
CMCC, "Considerations on interference avoidance for in-device coexistence", 3GPP TSG RAN WG2 #71, R2-104874, Aug. 23-27, 2010.
LG Electronics Inc, "Possible Solutions for In-device Interference Avoidance", 3GPP TSG RAN WG2 #71, R2-104880, Aug. 23-27, 2010.
Qualcomm Incorporated, Problem Scenarios and Proposed Solutions for In-device Coexistence, 3GPP TSG-RAN WG2 Meeting #71, R2-104910, Aug. 23-27, 2010, Madrid, Spain.
Huawei et al., Consideration on the details of in-device interference, 3GPP TSG-RAN WG2 Meeting #71 bis, R2-105587, Oct. 11-15, 2010, Xian, China.
3GPP; 3rd Generation Partnership Project; Technical Specification Group Radio Access Networks; Evolved Universal Terrestrial Radio Access (E-UTRA); Study on signalling and procedure for interference avoidance for in-device coexistence; 3GPP TR 36.816 v0.1.1; R2-105214; Oct. 5, 2010.
Huawei et al.; Consideration on the details of in-device interference; 3GPP TSG-RAN WG2 Meeting #71bis; R2-105587; Oct. 11-15, 2010; Xian, China.

* cited by examiner

IN-DEVICE INTERFERENCE AVOIDANCE METHOD AND APPARATUS FOR TERMINAL EQUIPPED WITH MULTIPLE COMMUNICATION MODULES

PRIORITY

This application claims the benefit under 35 U.S.C. § 119(e) of a United States Provisional patent application filed on Oct. 11, 2010 in the United States Patent and Trademark Office and assigned Ser. No. 61/391,743, and under 35 U.S.C. § 119(a) of a Korean patent application filed on Sep. 27, 2011 in the Korean Intellectual Property Office and assigned Serial No. 10-2011-0097469, the entire disclosure of which is hereby incorporated by reference.

BACKGROUND OF THE INVENTION

1. Field of the Invention

The present invention relates to wireless communication. More particularly, the present invention relates to a method for avoiding in-device interference in a terminal equipped with multiple heterogeneous communication modules.

2. Description of the Related Art

With the rapid popularization of smartphones, various radio technologies such as Wireless Local Area Network (WLAN), Bluetooth, and Global Positioning System (GPS) are widely used by means of the smartphones. In order to meet the various user requirements, it is now common for a portable terminal to integrate several communication technologies (e.g., cellular technology such as Long Term Evolution (LTE)/Universal Mobile Telecommunications System (UMTS), WLAN, Bluetooth, and Global Navigation Satellite System (GNSS)/GPS), which may potentially result in an inter-technology interference problem. This issue is under discussion in the name of In-Device Coexistence (IDC) in the 3rd Generation Partnership Project (3GPP).

The LTE/UMTS communication technology operates on various frequency bands while the Bluetooth and WLAN operate on the Industrial, Scientific and Medical (ISM) band of 2400~2483.5 MHz. Among the frequency bands assigned for the LTE/UMTS communication, Band 4 (2300~2400 MHz) and Band 7 uplink (2500~2670 MHz) are close to the ISM band used by Bluetooth and WLAN such that the simultaneous operations of the two technology modules cause significant interference to each other.

In LTE, the Discontinuous Reception (DRX) operation is defined for reducing the power consumption of the User Equipment (UE). That is, the UE checks the downlink channel periodically so as to wake up only when downlink traffic is detected but remains in a sleep state when no downlink traffic is detected. In the LTE system of the related art, however, the DRX operation is designed in consideration only with the downlink traffic and thus the uplink traffic is transmitted regardless of the DRX pattern. Recently, the DRX technique is being considered to reduce interference. However, the DRX technique is limited in its ability to accomplish such purpose with the DRX of the related art, which cannot control the transmission signal (i.e., uplink signal) causing the actual interference.

SUMMARY OF THE INVENTION

Aspects of the present invention are to address at least the above-mentioned problems and/or disadvantages and to provide at least the advantages described below. Accordingly, an aspect of the present invention is to provide a method and apparatus for avoiding in-device coexistence interference occurring between heterogeneous communication modules (e.g., between Long Term Evolution (LTE) and Wireless Local Area Network (WLAN), LTE and Bluetooth, or LTE and Global Positioning System (GPS)) incorporated in a mobile terminal.

According to an aspect of the present invention, when the in-device interference by a non-cellular communication module is detected or predicted, User Equipment (UE) sends the interference-related information to an evolved Node B (eNB) (or cell) through Radio Resource Control (RRC) signaling such that the eNB configures Discontinuous Reception (DRX) with a restriction of uplink transmission in an inactive time so as to reduce the interference.

In accordance with an aspect of the present invention, a method for avoiding interference in a terminal equipped with a first communication module and a second communication module is provided. The method includes one of detecting and predicting interference caused by the second communication module to communication of the first communication module, transmitting an interference occurrence information message to a base station for controlling to avoid the interference, and controlling to avoid the interference by executing one of a handover and discontinuous reception according to a control command included in an interference occurrence information response message transmitted by the base station.

In accordance with another aspect of the present invention, an apparatus for avoiding interference between a first communication module and a second communication module of a terminal is provided. The apparatus includes a transceiver of the first communication module for communicating signals with a base station, an interfering communication detector/determiner for detecting an activation request for the second communication module, and for determining whether the second communication module, when activated, interferes with communication of the first communication module, and a controller for generating and for transmitting an interference occurrence information message to a base station for controlling to avoid the interference, and for controlling execution of a handover or a discontinuous reception process according to a control command included in the interference occurrence information message.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the description is directed to Long Term Evolution (LTE) as a cellular communication technology, the present invention can be applied to other cellular communication technologies.

Figure 1:
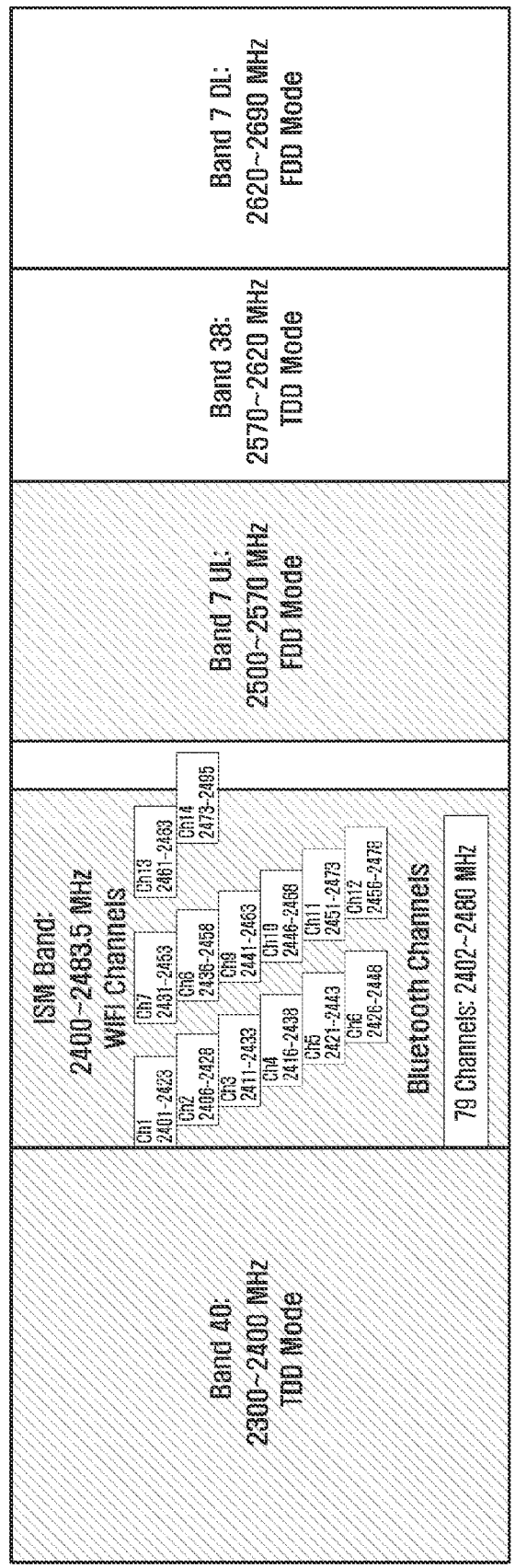
FIG. 1 is a diagram illustrating frequency bands for use in $3^{rd}$ Generation Partnership Project (3GPP) cellular communication systems that are adjacent to the Industrial, Scientific and Medical (ISM) band, according to the related art.

FIG. 1 is a diagram illustrating frequency bands for use in 3$^{rd}$ Generation Partnership Project (3GPP) cellular communication systems that are adjacent to the Industrial, Scientific and Medical (ISM) band, according to the related art.

Referring to FIG. 1, in-device coexistence interference becomes worse in a situation where a cell uses band 40 and a Wireless Local Area Network (WLAN) uses channel 1 or where the cell uses band 7 and the WLAN uses channel 13 or 14. Such in-device coexistence interference varies dynamically depending on the locations and channels of the cells, the channels of the WLANs, and traffic pattern. In an exemplary case of Bluetooth technology, the devices are classified into master and salves and the Bluetooth transmission timing is synchronized with the clock of the master such that the transmission is performed at an interval of at least 0.625 ms. This means the Bluetooth transmission may cause interference at the interval of 0.625 ms. In a case of operating a WLAN in a Time Division Duplex (TDD) mode, the in-device coexistence interference may occur in an uplink transmission period. There is therefore a need of an interference avoidance method especially directed to the uplink transmission.

In the following description, a terminal (or User Equipment (UE)) includes a first communication module responsible for cellular communication with a cellular network and a second communication module responsible for short or long range radio communication with an Internet Protocol (IP) network or Access Point (AP). In this case, the first communication module can be a cellular communication module responsible for communication with a base station (e.g., an evolved Node B (eNB)), and the second communication module can be one of a WLAN module, a Bluetooth module, and a Global Positioning System (GPS) module that have the possibility to cause interference to the cellular communication (e.g. LTE communication) by means of the first communication module.

Figure 2:
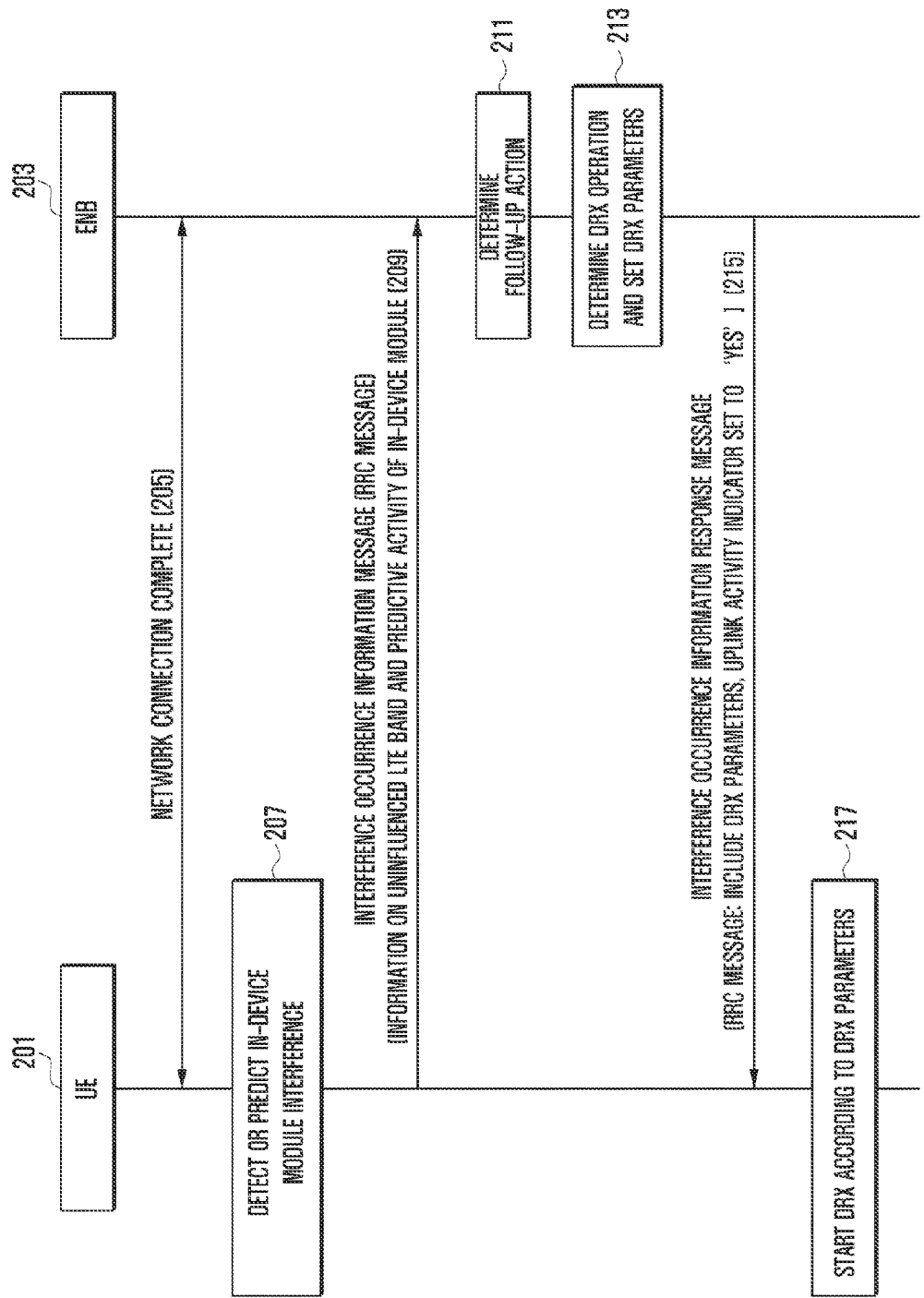
FIG. 2 is a signaling diagram illustrating an interference avoidance procedure according to an exemplary embodiment of the present invention.

FIG. 2 is a signaling diagram illustrating an interference avoidance procedure according to an exemplary embodiment of the present invention. FIG. 2 shows the interference procedure between a UE 201 and an eNB 203.

The UE 201 exchanges control messages with the eNB 203 to attach to the network in step 205. Next, the UE 201 determines whether the second communication module is enabled or requests to be activated in step 207. This means that the UE 201 detects or predicts the interference caused by the interfering Communication Technology (CT).

In order to detect or predict the interference occurrence, the LTE communication module can have information on whether the GPS or WLAN is active, detect the selection of the interfering CT (e.g. Bluetooth, WLAN, and GPS/Global Navigation Satellite System (GNSS)), detect an activation button (or power button), or measure the received signal from the cell.

Upon detecting or predicting the interference, the UE 201 sends the eNB 203 an interference occurrence information message including information for canceling interference in step 209. The interference occurrence information message may be transmitted through the Radio Resource Control (RRC) layer. The information for canceling interference (i.e., interference occurrence information) can include at least one of the information on the LTE frequency band or its center frequency influenced by the interference, ISM or GNSS band information, and predictive activity pattern of the interfering CT (e.g. transmission/reception period, power saving period/pattern, etc.).

Upon receipt of the interference occurrence information message, the eNB 203 determines the operation of the UE 201 based on the information carried in the message (e.g., traffic load states of the serving and target cells, Quality of Service (QoS) recommended by the UE, and QoS guaranteed by the target cell) in step 211. In more detail, the eNB 203 can initiate the handover of the UE 201 to another cell operating on another frequency band to avoid interference or instruct to avoid interference with a time division multiplexing technique, such as Discontinuous Reception (DRX).

If it is determined to use the time division transmission technique, such as DRX, the eNB 203 configures the DRX period and/or pattern of the UE 201 based on the information including the interference avoidance information in step 213.

The parameters and operations related to DRX are as follows. The UE 201 configures the DRX using RRC messages. Once the DRX is configured, the UE 201 monitors the Physical Downlink Control CHannel (PDCCH) during an active time defined according to the DRX interval and/or pattern (not always) as described below.

Here, the DRX period and/or pattern is determined with the configuration of the parameters such as on Duration-Timer, drx-InactivityTimer, drx-RetransmissionTimer, longDRX-Cycle (period including On duration and DRX available duration), and drxStartOffset.

The aforementioned active time indicates the running of one of:
- on DurationTimer (in a case of a long DRX cycle, starts at the time point when [(SFN*10)+subframe number] modulo (longDRX-Cycle)=drxStartOffset);
- drx-InactivityTimer (starts when downlink/uplink of new data resource allocation occurs);
- drx-RetransmissionTimer (starts when it is necessary for a corresponding Hybrid Automatic Repeat Request (HARQ) process to retransmit due to the necessity of HARQ retransmission); and
- mac-ContentionResolutionTimer (starts after transmission of Massage 3 in a random access operation; continue until receipt of Message 4).

In addition, the aforementioned active time indicates the situation of one of:
- transmitting a Scheduling Request and waiting for an additional operation;
- HARQ retransmission occurring in an uplink; and
- not receiving PDCCH after receipt of a Random Access Response.

The eNB 203 can set the longDrx-Cycle to a long or short value for configuring the DRX period of the UE 201 and adjust the On duration length by setting the aforementioned timer values. If it is predicted that the ISM or GNSS traffic is active, the eNB 203 decreases the Active Time of DRX (data transmission/reception period). Otherwise if it is predicted that the ISM or GNSS traffic is not active, the eNB 203 increases the Active Time of the DRX.

In order to configure the DRX as describe above, the eNB 203 sends the UE 201 an interference occurrence information response message including parameter values set at step 213 and the uplink activity indicator in step 215. According to an exemplary embodiment of the present invention, the eNB 203 sets the uplink activity indicator to 'Yes' in order to control the interference of the UE using the time division DRX.

Finally, the UE starts DRX according to the parameters set by the eNB 203 in step 217. How to perform DRX is described hereinafter in more detail.

In a case where the uplink activity indicator is set to 'Yes,' the UE 201 performs uplink transmission during the active time in the DRX cycle unlike the DRX operation of the related art. That is, the DRX period is divided into the active time and inactive time during which data is not transmitted. Although the data transmission is allowed during the inactive time in the DRX process of the related art, the following signals are not allowed for transmission during the inactive time according to an exemplary embodiment of the present invention:
- Dedicated Scheduling Request (D-SR): The eNB allocates control channel resources to a specific UE in order for the UE to request, if necessary, uplink resource allocation;
- HARQ retransmission;
- Sounding Reference Symbols (SRS): reference signals transmitted to eNB for UE channel estimation; and
- Semi-Persistent Scheduling (SPS): uplink data transmission through a fixed region.

In the random access process, the UE 201 transmits the random access preamble only during the active time. In a case where the random access process has already started, the uplink transmission is allowed in order for the UE 201 to complete the random access process. That is, when the random access process has already started, it is allowed to receive message 2, transmit message 3, and receive message 4.

According to an exemplary embodiment of the present invention, the Scheduling Request (SR) and Random Access Preamble prohibited in the duration other than the Active Time can be determined to be transmitted or not in consideration of the priority of the data.

In a radio bearer configuration, the eNB can configure such that the SR or Random Access Preamble transmission is allowed or not per radio bearer in consideration of the radio bearer priority and delay requirement, even in the inactive time. For example, since the RRC message influences the handover of the UE, it is required not to delay the transmission of RRC message. Accordingly, the SR or random access preamble can be allowed to be transmitted on the Signaling Radio Bearer (SRB) during the inactive time. Meanwhile, on the radio bearer for the data which is not delay sensitive, such as File Transfer Protocol (FTP) data, the SR or random access preamble should not be allowed to be remitted.

The active time-only SR and random access preamble transmission allowance can be configured by means of an RRC control message. The active time-only transmission allowance can be applied for the Radio Bearers (RBs) except for the SRB.

Figure 3:
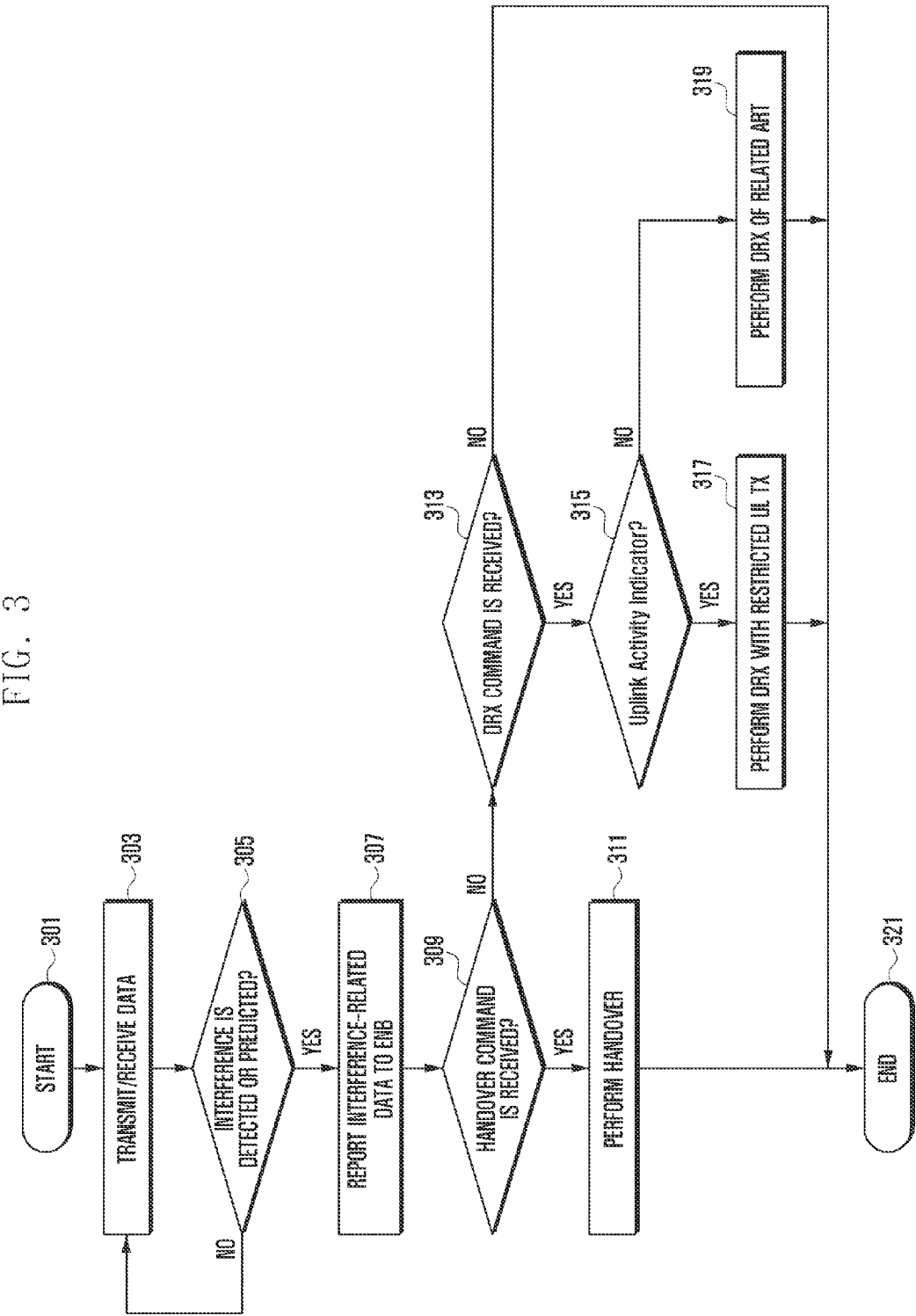
FIG. 3 is a flowchart illustrating an interference avoidance procedure of a User Equipment (UE) according to an exemplary embodiment of the present invention.

FIG. 3 is a flowchart illustrating an interference avoidance procedure of a UE according to an exemplary embodiment of the present invention.

Referring to FIG. 3, the UE 201 first connects to the eNB 203 and the procedure starts in step 301. The UE 201 communicates data with the eNB 203 in step 303.

Afterward, the UE 201 monitors to detect interference or interference prediction from the in-device heterogeneous module, i.e., the second communication module in step 305. If the interference or interference prediction is not detected, the process returns to step 303. Otherwise, if the interference or interference prediction is detected, the UE 201 generates the interference avoidance information, i.e., interference occurrence information, and reports the interference occurrence information to the eNB in step 307. The interference occurrence information can include at least one of an LTE frequency band or its center frequency influenced by the interference, ISM or GNSS band information, and a predictive activity pattern of the interfering CT (e.g., transmission/reception cycle, power saving period/pattern, etc.).

Upon receipt of the interference occurrence information, the eNB 203 determines the action of the UE 201 for avoiding the interference and sends an interference occurrence information response message with the determined action to the UE 201.

If the interference occurrence information response message is received from the eNB 203, the UE 201 determines whether a handover command is received in step 309. If the handover command is received, the UE 201 performs handover to the frequency band or the target cell informed by the eNB 203 in step 311.

Otherwise, if the handover command is not received, the UE 201 determines whether a DRX configuration command is received in step 313. If the DRX configuration command is received, the UE 201 determines whether the uplink activation indicator is set to 'Yes' in step 315. If the uplink activation indicator is set to 'Yes,' the UE 201 performs uplink transmission during the active time in the DRX cycle (i.e., DRX with restricted UpLink (UL) transmission) in step 317. Otherwise, if the uplink activation indicator is set to 'No,' the UE 201 performs uplink transmission in the DRX mode of the related art in step 319.

Figure 4:
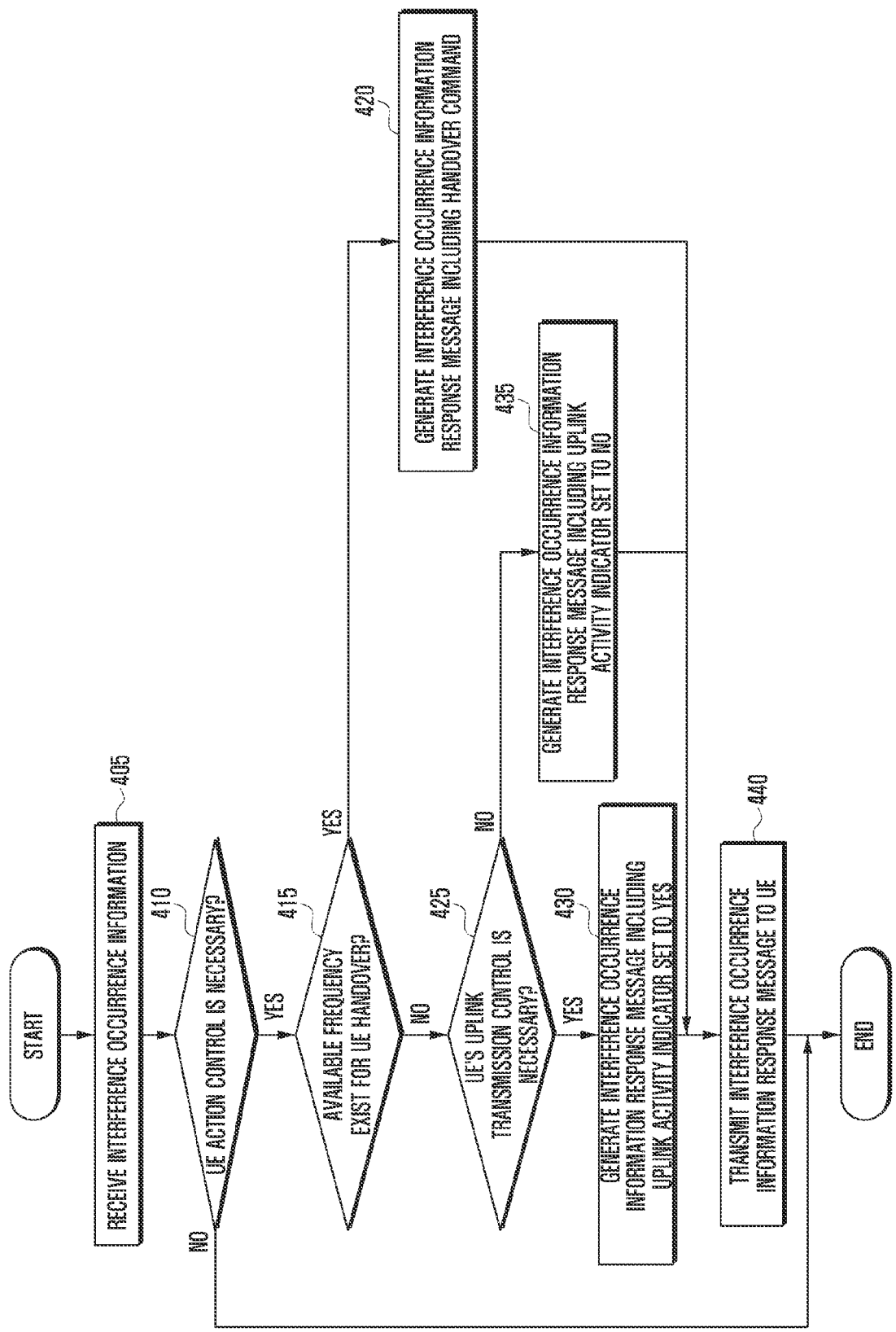
FIG. 4 is a flowchart illustrating an interference avoidance procedure of an evolved Node B (eNB) according to an exemplary embodiment of the present invention.

FIG. 4 is a flowchart illustrating an interference avoidance procedure of an eNB according to an exemplary embodiment of the present invention.

After completing the network access process with the UE 201, the eNB receives the interference occurrence information message transmitted by the UE 201 in step 405. The interference occurrence information message is transmitted by the UE 201 when the interference caused by the in-device heterogeneous module is detected or predicted.

Upon receipt of the interference occurrence information message, the eNB 203 determines whether it is necessary to control the action of the UE 201 in step 410. The eNB 203 can determine whether the interference caused by the in-device heterogeneous module makes normal communication impossible based on the information on the LTE frequency band influenced by the interference which is included in the interference occurrence information message. If it is determined that the UE 201 is influenced by the interference to the extent that the UE 201 cannot perform communication, the eNB 203 can control to avoid the in-device coexistence interference with the handover or DRX configuration command.

That is, if it is necessary to control the action of the UE at step 410, the eNB 203 determines whether there is an available frequency for handover of the UE 201 in step 415. The available frequency for handover can be any of the other frequency of the serving cell or a certain frequency of the target cell. If there is the available frequency, the eNB 203 generates an interference occurrence information response message including the handover command in step 420.

Otherwise, if there is not an available frequency, the eNB 203 determines to control the in-device coexistence interference of the UE 201 through DRX configuration. The eNB 203 determines whether it is necessary to control the uplink transmission of the UE 201 in step 425. If it is necessary to control the uplink transmission of the UE 201, the eNB 203 generates the interference occurrence information response message including the uplink activity indicator set to 'Yes' in step 430. Otherwise, if it is not necessary to control the uplink transmission of the UE 201, the eNB 203 generates the interference occurrence information response message including the uplink activity indicator set to 'No' in step 435.

Finally, the eNB 203 sends the interference occurrence information response message to the UE 201 in step 440.

Figure 5:
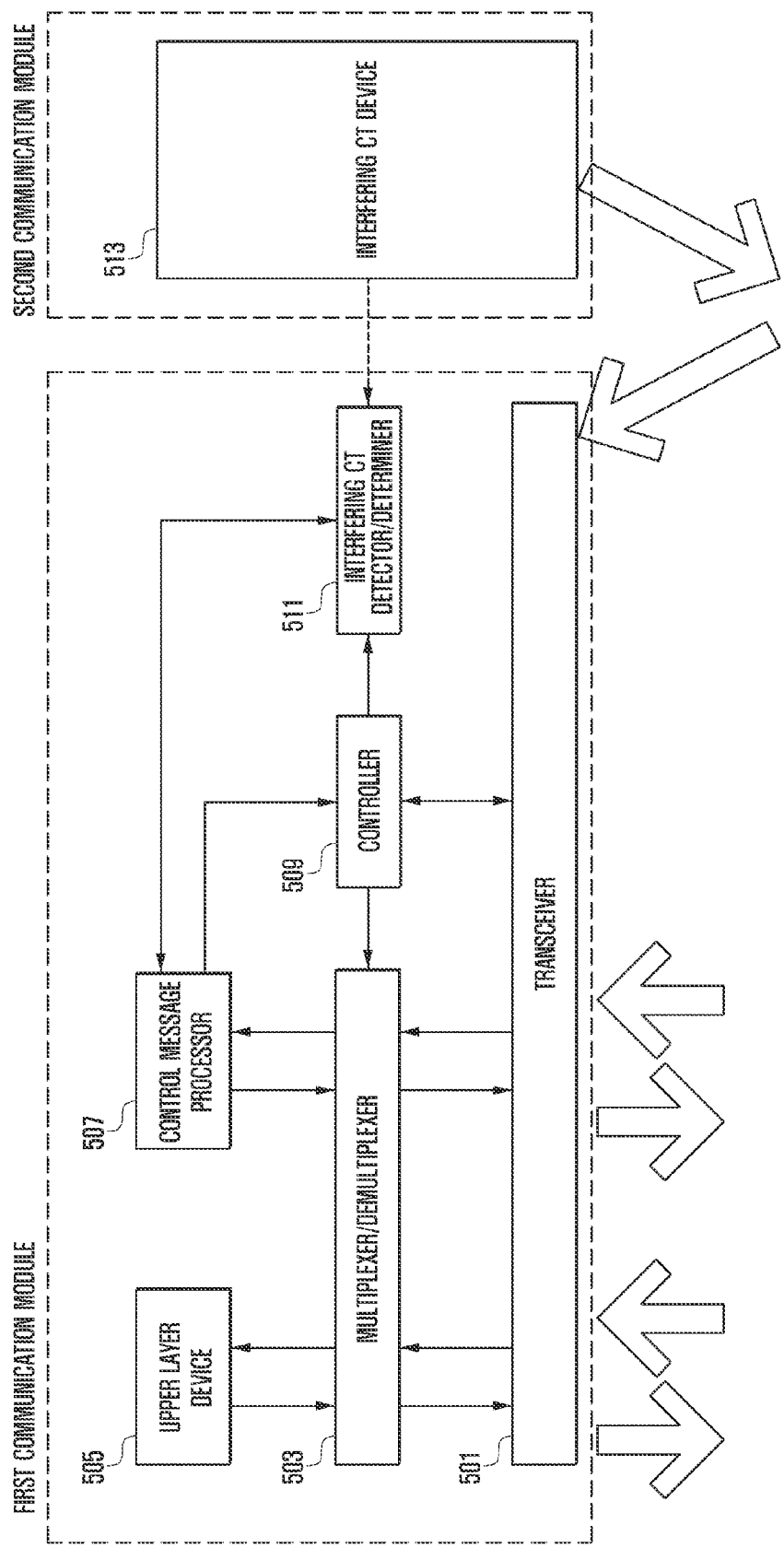
FIG. 5 is a block diagram illustrating a configuration of a UE according to an exemplary embodiment of the present invention.

FIG. 5 is a block diagram illustrating a configuration of a UE according to an exemplary embodiment of the present invention.

Referring to FIG. 5, the UE 201 according to an exemplary embodiment of the present invention can include the first communication module and the second communication module. The first communication module is the module responsible for cellular communication with a base station. The second communication module is one of the WLAN module, Bluetooth module, and GPS module that can cause in-device coexistence interference to the cellular communication (e.g., LTE communication) of the UE. Here, the second communication module can be referred to as an interfering CT device as shown in FIG. 5.

The UE 201 transmits and receives data generated by an upper layer device 505 and the control messages with the eNB 203 by means of a control message processor 507. In the transmission mode, the UE 201 multiplexes the data to be transmitted by means of the multiplexer of the multiplexer/demultiplexer 503 under the control of the controller 509 and transmits the multiplexed data by means of a transceiver 501.

In the reception mode, the UE 201 receives the radio signal by means of the transceiver 501, demultiplexes the received signal by means of the demultiplexer of the multiplexer/demultiplexer 503, and delivers the demultiplexed data to the upper layer device 505 or the control message processor 507 according to the message information.

According to an exemplary embodiment of the present invention, an interfering CT device 513 can notify an interfering CT detector/determiner 511 of the power-on or activation of the second communication module directly. Also, the controller 509 can detect the signal transmitted by the interfering CT device 513 as a strong interference signal to the transceiver 501 of the first communication module and notify the interfering CT detector/determiner 511 of the interference situation.

Upon detecting the interference from the second communication module, the interfering CT detector/determiner 511 determines whether it is necessary to avoid the interference and, if necessary, notifies the controller 509 of the necessity to avoid interference. When the interference is equal to or greater than a predetermined threshold, the interfering CT detector/determiner 511 determines that the interference avoidance is necessary.

In this case, the controller 509 controls the control message processor 507 to generate the interference occurrence information message and controls the transceiver 501 to transmit the interference occurrence information message.

The controller 509 receives the interference occurrence information response message from the eNB 203 by means of the control message processor 507. The controller 509 analyzes the UE action command, i.e., handover command or DRX configuration command, included in the interference occurrence information response message. In a case where the interference occurrence response message includes the handover command, the controller 509 performs the handover process to the indicated frequency or target cell. In a case where the interference occurrence response message includes the DRX configuration command, the controller 509 determines whether the uplink activation indicator is set to 'Yes.' If the uplink activation indicator is set to 'Yes,' the controller 509 controls such that the uplink transmission is performed only during the active time in the DRX cycle. Otherwise, if the uplink activation indicator is set to 'No,' the controller 509 controls such that the uplink transmission is performed in the DRX mode of the related art. In the DRX mode of the related art, the controller 509 controls such that the uplink transmission is performed in the DRX cycle regardless of the active and inactive time.

Although the description is directed to the case where the control message processor 507, controller 509, and interfering CT detector/determiner 511 are separately configured and operate independently for convenience in description, the present invention is not limited thereto. For example, the functions of the control message processor 507 and the interfering CT detector/determiner 511 can be performed by the controller 509.

Figure 6:
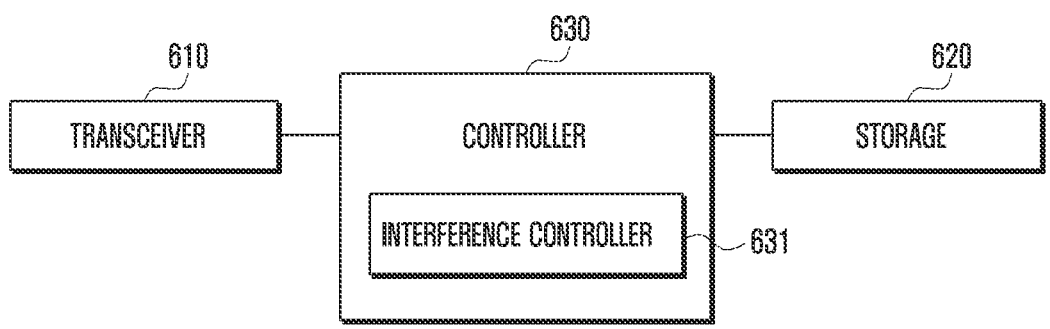
FIG. 6 is a block diagram illustrating a configuration of an eNB according to an exemplary embodiment of the present invention.

FIG. 6 is a block diagram illustrating a configuration of an eNB according to an exemplary embodiment of the present invention. As shown in FIG. 6, the eNB 203 can include a transceiver 610, a storage 620, and a controller 630.

The transceiver 610 is responsible for communication of the eNB 203 with the UE 201 and for message exchange with other cellular network nodes. The transceiver 610 can include wired or wireless communication interfaces.

The storage 620 can store programs used for operating the eNB 203 according to an exemplary embodiment of the present invention. In particular, in an exemplary embodiment of the present invention, the storage 620 can store the interference occurrence information, e.g., the LTE frequency band influenced by the interference, reported from the UE 201.

The controller 630 controls overall operations of the eNB 203. In particular, in an exemplary embodiment of the present invention, the controller 630 can further include an interference controller 631 for controlling the in-device coexistence interference of the UE 201.

Upon receipt of the interference occurrence information message from the UE 201, the interference controller 631 determines whether it is necessary to control the operation of the UE 201. If it is necessary to control the operation of the UE 201, the interference controller 631 determines whether there is an available frequency for handover of the UE 201. The available frequency can be the other frequency of the serving cell or a certain frequency of the target cell. If there is the available frequency, the interference controller 631 generates the interference occurrence information response message including the handover command and controls to transmit the interference information response message to the UE 201.

If there is no available frequency, the interference controller 631 determines to control the interference of the UE 201 through DRX configuration and determines whether it is necessary to control the uplink transmission of the UE 201. If it is necessary to control the uplink transmission of the UE 201, the interference controller 631 generates the interference occurrence information response message including the uplink activation indicator set to 'Yes.' Otherwise, if it is not necessary to control the uplink transmission of the UE 201, the interference controller 631 generates the interference occurrence information response message including the uplink activity indicator set to 'No.' Next, the interference controller 631 controls such that the interference occurrence information response message is transmitted to the UE 201.

The interference avoidance method of exemplary embodiments of the present invention is advantageous to mitigate the in-device coexistence interference between two communication modules for cellular communication and another radio communication by time multiplexing the transmissions in consideration of a current interference state and potential interference causes.

As described above, the interference avoidance method proposed by exemplary embodiments of the present invention is advantageous in that the UE equipped with heterogeneous communication modules can avoid in-device coexistence interference using time division multiplexing and uplink transmission restriction in a DRX cycle.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for avoiding interference in a terminal equipped with a first communication module and a second communication module, the method comprising:

detecting interference caused by the second communication module to communication of the first communication module;

transmitting, to a base station, an interference occurrence information message for controlling to avoid the interference;

receiving, from the base station, an interference occurrence information response message including a control command instructing an operation of discontinuous reception; and executing the discontinuous reception based on the control command, wherein the executing comprises:

determining whether an uplink activity indicator is set in the control command, determining, when the uplink activity indicator is set, whether an uplink data is to be transmitted by the first communication module in an inactive time of the discontinuous reception based on at least one of priority of the uplink data, priority of a radio bearer for transmission of the uplink data, and delay requirement of the uplink data, transmitting, when the uplink activity indicator is set and the uplink data is determined not to be transmitted by the first communication module in the inactive time of the discontinuous reception, the uplink data only in an active time of the discontinuous reception, and transmitting, when the uplink activity indicator is not set or the uplink data is determined to be transmitted by the first communication module in the inactive time of the discontinuous reception, the uplink data in the active time or the inactive time of the discontinuous reception.

2. The method of claim 1, wherein the executing comprises blocking transmission of data related to a dedicated scheduling request, a hybrid automatic repeat request (HARQ), sounding reference symbols (SRS), and semi-persistent scheduling, out of the active time.

3. The method of claim 1, wherein the executing comprises allowing, when the terminal is in a random access process, receipt of a message related to the random access process.

4. The method of claim 1, wherein the interference occurrence information message comprises information on at least one of a frequency band influenced by the interference, a center frequency of the frequency band, an industrial, scientific and medical (ISM) band, and a predictive activity of the second communication module.

5. The method of claim 1, wherein the interference occurrence information message is transmitted through radio resource control (RRC) signaling.

6. An apparatus for avoiding interference between a first communication module and a second communication module of a terminal, the apparatus comprising:

a transceiver of the first communication module configured to communicate signals with a base station; and a controller configured to:

detect interference caused by the second communication module to communication of the first communication module, control the transceiver to transmit, to the base station, an interference occurrence information message for controlling to avoid the interference, control the transceiver to receive, from the base station, an interference occurrence information response message including a control command instructing an operation of, discontinuous reception, executing the discontinuous reception based on the control command, wherein the controller is further configured to:

determine whether an uplink activity indicator is set, determining, when the uplink activity indicator is set, whether an uplink data is to be transmitted by the first communication module in an inactive time of the discontinuous reception based on at least one of priority of the uplink data, priority of a radio bearer for transmission of the uplink data, and delay requirement of the uplink data, control the transceiver to transmit, when the uplink activity indicator is set and the uplink data is determined not to be transmitted by the first communication module in the inactive time of the discontinuous reception, the uplink data only in an active time of the discontinuous reception, and control the transceiver to transmit, when the uplink activity indicator is not set or the uplink data is determined to be transmitted by the first communication module in the inactive time of the discontinuous reception, the uplink data in the active time or the inactive time of the discontinuous reception.

7. The apparatus of claim 6, wherein the controller is configured to block transmission of data related to a dedicated scheduling request, a hybrid automatic repeat request (HARQ), sounding reference symbols (SRS), and semi- persistent scheduling, out of the active time.

8. The apparatus of claim 6, wherein the controller is configured to allow, when the terminal is in a random access process, receipt of a message related to the random access process.

9. The apparatus of claim 6, wherein the interference occurrence information message comprises information on at least one of a frequency band influenced by the interference, a center frequency of the frequency band, an Industrial, Scientific and Medical (ISM) band, and a predictive activity of the second communication module.

10. The apparatus of claim 6, wherein the interference occurrence information message is transmitted through radio resource control (RRC) signaling.

11. The apparatus of claim 6, wherein the controller is configured to detect the interference received via the transceiver from the second communication module and notify the interfering communication detector/determiner of the interference.

* * * * *